United States Patent Office 3,600,411
Patented Aug. 17, 1971

3,600,411
REDOX POLYESTER POLYMERS
Harold G. Cassidy, Gerhard Wegner, and Nobuo Nakabayashi, New Haven, Conn., assignors to Research Corporation, New York, N.Y.
No Drawing. Filed Oct. 7, 1968, Ser. No. 765,612
Int. Cl. C07c 49/64; C08g 17/08, 33/10
U.S. Cl. 260—396                             4 Claims

ABSTRACT OF THE DISCLOSURE

Novel redox polymers useful as antioxidants are prepared by the direct condensation of a quinone-diol with a diacyl chloride, phosgene or a diisocyanate.

---

This invention relates to novel redox polymers and to novel quinone-diol intermediates used in the preparation of such polymers. The work on which this application was based was financed in whole or in part by the U.S. Public Health Service.

Redox polymers containing the hydroquinone-quinone system have been prepared, H. G. Cassidy and K. A. Kun "Oxidation-Reduction Polymers," Interscience Publishers, Inc., New York, N.Y., 1965. Vinylhydroquinone as such cannot be successfully polymerized since the free hydroquinone group is a strong inhibitor for both radical and ion-induced polymerization. This difficulty has been overcome to some extent by blocking one or both of the phenolic hydroxyl groups by ester or ether formation prior to polymerization. Careful removal of blocking groups yields the redox polymer. Such methods have the twin disadvantages of requiring the extra steps of introducing and removing the blocking groups. Moreover, the polymer obtained, apparently as a result of side reactions, has redox properties differing somewhat from these of the reversible hydroquinone-quinone system.

It is, therefore, a principal object of the present invention to provide hydroquinone-quinone redox polymers which can be prepared by direct condensation without the necessity of blocking protecting phenolic hydroxy groups.

In accordance with this and other objects and advantages which will become apparent from the specification, the present invention is redox polymers characterized by the following structural units:

(I) Redox polyesters

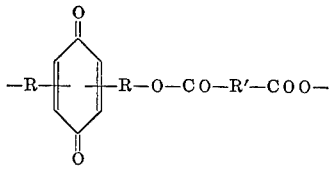

and

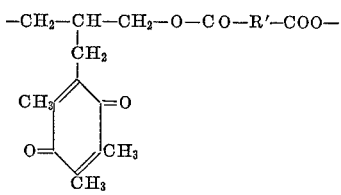

(II) Redox polycarbonates

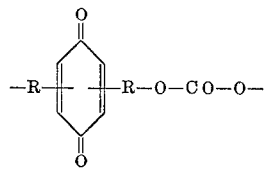

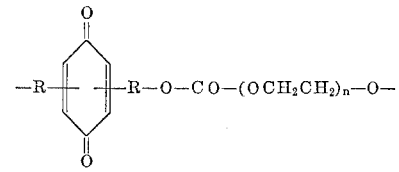

wherein $n$ is an integer.

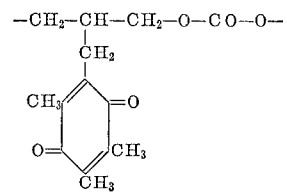

and

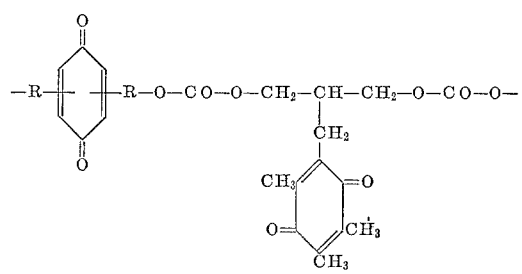

(III) Redox polyurethanes

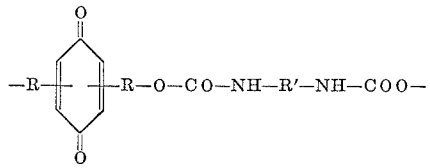

and

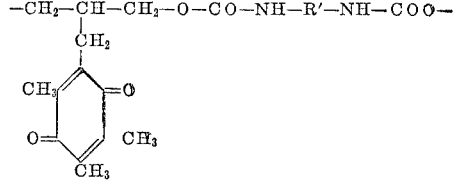

R and R' represent alkylene or phenylene in the above formulae. Although these polymers are shown as being in the oxidized form, the invention also contemplates the same polymers in the reduced or hydroquinone form.

The utility of redox polymers generally is described in the Cassidy and Kun text cited above. The redox polymers of the present invention are particularly useful in the treatment of boiler-feed waters, as anti-oxidant stabilizers in various industrial products, in battery cells, and as photographic chemicals wherein their low diffusability is of advantage.

The present invention also contemplates the following novel quinone-diol intermediates utilized in the preparation of the above redox polymers:

2,5-bis(2'-hydroxyethyl)-1,4-benzoquinone,
2,5-bis(3'-hydroxypropyl)-1,4-benzoquinone, and
2-(duroquinonyl)propan-1,3-diol.

The benzoquinone-diol intermediates used in preparing the redox polymers of the present invention are most conveniently made by oxidation of the corresponding hydroquinones. The hydroquinones, in turn, are made by reduction of the diesters of the diols to be prepared.

The redox polyesters, polycarbonates, and polyurethanes of the present invention are most conveniently prepared by condensation of the quinone-diol reactants with equivalent quantities of a diacyl chloride, phosgene or diisocyanate, respectively. Mixed polycarbonates or polyurethanes are prepared by reacting benzoquinone-diol and phosgene or diisocyanate pre-condensate with a second quinone-diol. Extended polycarbonates are prepared by the condensation of the quinone-diol reactant with equivalent quantities of a glycol bischloroformate, prepared by the reaction of a monomeric or polymeric glycol with phosgene.

Generally speaking, the quinone and hydroquinone forms of the redox polymers of the present invention are reversibly interconvertible. The yellow quinone form, as produced by condensation, exhibits typical carbonyl absorption in the infrared at 1650 cm.$^{-1}$ and in the ultraviolet at 250–260 m$\mu$. These disappear completely on reduction and the white hydroquinone form is characterized by absorption in the ultraviolet at about 300 m$\mu$. Solutions of the hydroquinone form are more viscous, presumably due to an increase in hydrogen bonding.

The hydroquinone form of the duroquinonyl-based polymers is readily oxidized in air to the quinone form. A stable red quinhydrone-like product is obtained when mixed 2-(duroquinonyl)propan-1,3-diol and 2,5-bis(hydroxyalkyl)-1,4-benzoquinone based polymers are exposed to air.

Our invention is further illustrated by means of the following non-limiting examples:

PREPARATION OF INTERMEDIATES

Example 1

(A) 2,5-bis(2'-hydroxyethyl)hydroquinone.—This example illustrates the general procedure for the preparation of bis(hydroxyalkyl)hydroquinones by reduction of the corresponding esters. A solution of 0.02 mole of diethyl 3,6-dihydroxy-1,4-benzenedicarboxylate in 50 ml. of dry tetrahydrofuran was added dropwise to a well-stirred slurry of 3.0 g. (0.079 mole) of lithium aluminum hydride in 40 ml. of dry tetrahydrofuran and heated with stirring for one hour at reflux. The reaction mixture was then cooled in an ice bath and excess lithium aluminum hydride destroyed by careful addition of 5 ml. of cold water. Two layers formed on addition of 40 ml. of 50% sulfuric acid and 40 ml. of saturated ammonium chloride. The organic layer was separated and the aqueous layer further extracted with four 80 ml. portions of tetrahydrofuran. The combined extracts were shaken with anhydrous magnesium sulfate, filtered, and concentrated in vacuo at room temperature to about 50 ml. The crystals obtained on cooling to −20° C. were separated, washed with a small amount of solvent and dried in vacuo. The product was recrystallized from a small amount of hot water to give long white needles, M.P. 184° C. Yield 76.5%.

*Analysis.*—Calcd. for $C_{10}H_{14}O_4$ (percent): C, 60.60; H, 7.12. Found (percent): C, 60.40; H, 7.25.

(B) 2,5 - bis(3' - hydroxypropyl)hydroquinone.—Using the general procedure, the white crystals obtained by the reduction of diethyl 3,6-dihydroxy-p-xylenyldicarboxylate were washed with hexane and then with acetonitrile. Recrystallization from a minimum amount of hot water gave a 66% yield of pure white prisms, M.P. 168.5° C.

*Analysis.*—Calcd. for $C_{12}H_{18}O_4$ (percent): C, 63.70; H, 8.02. Found (percent): C, 63.57; H, 8.07.

Example 2

(A) 2,5-bis(2'-hydroxyethyl)-1,4-benzoquinone.—This example illustrates the general procedure for the preparation of bis(hydroxyalkyl)benzoquinones. 2.0 moles of 2,5-bis(2'-hydroxyethyl)hydroquinone in 40 ml. of dry tetrahydrofuran was treated with 0.6 g. of silver oxide and 1.0 g. of magnesium sulfate. The reaction mixture was stirred at room temperature for 30 minutes, filtered and the filtrate evaporated in vacuo at room temperature to a yellow, crystalline solid. The product was recrystallized from tetrahydrofuran-pentane to give yellow needles, M.P. 77° in 95% yield.

*Analysis.*—Calcd. for $C_{10}H_{12}O_4$ (percent): C, 61.22; H, 6.17. Found (percent): C, 61.19; H, 6.32.

(B) 2,5 - bis(3' - hydroxypropyl)-1,4-benzoquinone.—Using the general procedure, the solid product obtained by the oxidation of 2,5 - bis(3' - hydroxypropyl)hydroquinone was recrystallized from tetrahydrofuran and pentane, to give a 93% yield of bright yellow needles, M.P. 99° C.

*Analysis.*—Calcd. for $C_{12}H_{16}O_4$ (percent): C, 64.27; H, 7.19. Found (percent): C, 64.58; H, 7.47.

Example 3

(A) Diethyl 3 - hydroxy - 6 - methoxy-2,4,5-trimethylbenzylmalonate.—To a sodium ethylate solution, 610 g. (0.265 mol.) sodium in 135 ml. absolute ethanol, there was added dropwise with cooling 23.2 g. (0.145 mol.) ethyl malonate in 40 ml. absolute ethanol. Fifteen minutes later, 28.2 g. (0.131 mol.) of 3-hydroxy-6-methoxy-2,4,5-trimethylbenzyl chloride in 100 ml. dry tetrahydrofuran was added slowly. The reaction mixture was refluxed for 90 minutes, neutralized with acetic acid, the solvent removed and residue suspended in water and extracted with ether. After drying with magnesium sulfate, the ether was evaporated and the residue crystallized from carbon tetrachloride. Yield 13.9 g. (31.4%) white crystals, M.P. 118.9° C.

*Analysis.*—Calcd. for $C_{18}H_{26}O_6$ (percent): C, 63.88; H, 7.75. Found (percent): C, 63.90; H. 7.68.

(B) 2-(3'-hydroxy - 6' - methoxy - 2',4',5' - trimethylbenzyl)propan-1,3-diol.—To a stirred suspension of 1.2 g. lithium aluminium hydride in 50 ml. dry tetrahydrofuran cooled in ice, was added dropwise 50 ml. tetrahydrofuran containing 5.5 g. (0.0162 mol.) of diethyl 3-hydroxy-6-methoxy - 2,4,5 - trimethylbenzylmalonate. After the vigorous reaction had subsided, the mixture was refluxed for two hours. Excess hydride was removed by the careful addition of water and the mixture neutralized with acetic acid. Saturated aqueous ammonium chloride solution was added and the organic layer decanted. The lower water layer was washed with ether, and the washings and organic layer were combined and dried with magnesium sulfate. The solvent was removed by evaporation and the residue recrystallized from ethanol to give 2.55 g. (61.5%) of white crystals, M.P. 173–5° C.

*Analysis.*—Calcd. for $C_{14}H_{22}O_4$ (percent): C, 66.11; H, 8.72. Found (percent): C, 65.72; H, 8.57.

(C) 2-(duroquinonyl)propan - 1,3 - diol.—To 22.0 g. (0.0866 mol.) 2-(3'-hydroxy - 6' - methoxy-2',4',5' - trimethylbenzyl)propan-1,3-diol in 700 ml. tetrahydrofuran was added 700 ml. water, then 44.0 g. (0.995 mol) lead tetraacetate. The suspension was stirred and refluxed for 30 minutes. Sodium hydroxide was added and the mixture extracted with ether. On drying of the extract and evaporation of the ether, there was obtained a red-yellow residue which was dissolved in a small amount of tetrahydrofuran and a solid precipitated by the addition of n-heptane. On recrystallization from tetrahydrofuran and n-heptane there was obtained 11.0 g. (63.4%) of product, M.P. 79.0–79.5° C.

*Analysis.*—Calcd. for $C_{13}H_{18}O_4$ (percent): C, 65.53; H, 7.61. Found (percent): C, 65.46; H, 7.58.

PREPARATION OF POLYESTERS

Example 4

This example illustrates the general procedure for preparing quinone polyesters. Exactly 5.00 mmole of the reactant benzoquinone-2,5-diol was dissolved in a mixture of 10 ml. freshly distilled tetrahydrofuran and 2.0 ml. pyridine. The clear solution was cooled to 0° C. and exactly 5.00 mmole of the reactant acyl chloride dissolved in 5.0 ml. tetrahydrofuran added with stirring. Care was taken during the polycondensation step to exclude atmospheric moisture. The reaction mixture was permitted to warm up to 30° C. and, after one hour at that temperature, was filtered through a glass filter funnel and the residue washed with two 10 ml. portions of tetrahydrofuran. The combined filtrates were poured into a large excess of n-hexane precipitating the polymer product as a yellow solid or yellow to brown oil. The polymer was purified by dissolving it in tetrahydrofuran and reprecipitating it from n-hexane. In the case of polymers insoluble in the reaction medium, the residue on the glass filter was washed with cold water to dissolve out pyridinium hydrochloride leaving the polymer on the filter as a bright yellow powder. Drying was over sulfuric acid in vacuo for 24 hours. The yields obtained ranged between 80 and 90%.

Example 5

This example illustrates the general procedures utilized to reduce quinone polymers to the hydroquinone form.

(A) 0.5 g. of the quinone polyester was dissolved in 20 ml. tetrahydrofuran previously saturated with concentrated ammonium chloride solution. The resultant solution was shaken for about 5 minutes with two portions of a 10% solution of sodium hydrosulfite in water saturated with ammonium chloride and tetrahydrofuran. The color of the solution changed from bright yellow to colorless or faint yellow. The polymer solution was washed with concentrated ammonium chloride solution and then poured into a large excess of water containing some potassium chloride. The reduced polymer precipitated as a white solid which was separated, washed with water and dried over sulfuric acid.

(B) 0.36 g. of quinone polyester was dissolved in 30 ml. 95% dioxane and hydrogenated using a palladium-charcoal catalyst; the theoretical amount of hydrogen was absorbed in about 20 minutes. The resultant colorless solution was filtered into a large excess of water containing some potassium chloride. The reduced polymer precipitated as white solid which was separated, washed with water and dried in vacuo.

(C) Polymers insoluble in 95% tetrahydrofuran were dissolved in 90% butyrolactone at 80–100° C. and solid sodium hydrosulfite added with vigorous stirring. The resultant colorless solution, while still hot, was poured into an excess of water. The reduced polymer precipitated as white solid which was separated, washed and dried as described above. Essentially quantitative yields of hydroquinone polymers were obtained by each method. Specific viscosities were determined at a concentration of 5 g./l. in 95% tetrahydrofuran at 25° C.

with sodium borohydride or catalytic reduction with hydrogen.

The quinone form of (a) had a specific viscosity of 0.06; the reduced or hydroquinone form 0.10 (100 ml./g.). The quinone form of (b) had a specific viscosity of 0.04; the hydroquinone form 0.08.

Elemental analysis, both polymers having the empirical formula $C_{21}H_{20}O_6)_n$.—Calculated: C, 68.47; H, 5.47. Found (a): C, 68.18, H, 5.52. Found (b): C, 68.21; H, 5.51.

PREPARATION OF POLYCARBONATES

Example 7

This example illustrates the general procedure utilized for the preparation of quinone polycarbonate polymers. 1.79 g. (8.00 mmol) of 2,5 - bis(3'-hydroxypropyl)-1,4-benzoquinone was dissolved in 35 ml. tetrahydrofuran containing 5.0 ml. pyridine. The mixture was cooled to −20° C. and 1.0 ml. phosgene was slowly added dropwise with vigorous stirring. When the addition was complete, the temperature was allowed to rise to 0° C. and the mixture stirred for 1 hour additional. Excess phosgene was driven off by a stream of dry nitrogen and the reaction mixture filtered through a glass filter. On pouring the filtrate into 300 ml. n-pentane, the polymer product separated as a dark yellow oil. The oil was dissolved in tetrahydrofuran and precipitated with n-pentane to form brown-yellow flakes which dried to an 80% yield of brittle yellow solid. The polycarbonate product was soluble in acetone, chloroform, tetrahydrofuran, dimethylformamide and insoluble in water, aliphatic hydrocarbons and acetic acid.

Example 8

(A) This example illustrates the general procedure for the preparation of polyethyleneglycolbischloroformates. In a typical run, 5.6 ml. (0.08 mole) phosgene was condensed in an all glass apparatus equipped with a Dry-Ice cooled condenser. A solution of 0.04 mole of the polyethyleneglycol (based on analysis of the number endgroups present) dissolved in 50 ml. benzene was added dropwise with vigorous stirring. When the addition was completed, the temperature of the reaction mixture was permitted to rise to room temperature over a period of 2 hours and then heated at 50° C. for an additional 3 hours. Excess phosgene was swept out by a stream of dry nitrogen and the benzene evaporated in vacuo with warming at a bath temperature of 50° C.

(B) This example illustrates the general procedure for

| Reactants | | | Specific viscosity (cm.³/g.) |
|---|---|---|---|
| Benzoquinone bis-2,5-diol | Acid chloride | Polymer (method) | |
| 2'-hydroxyethyl | Oxalyl | Quinone | 24.0 |
| | | Hydroquinone (C) | |
| Do | Succinoyl | Quinone | 4.3 |
| | | Hydroquinone (A) | 8.9 |
| Do | Sebacoyl | Quinone | 21.2 |
| | | Hydroquinone (A) | 38.2 |
| Do | Isophthaloyl | Quinone | 9.1 |
| | | Hydroquinone (C) | |
| 3'-hydroxypropyl | Sebacoyl | Quinone | 20.6 |
| | | Hydroquinone (A) | 26.6 |
| Do | Isophthaloyl | Quinone | 7.1 |
| | | Hydroquinone (A) | 9.1 |
| 4'-hydroxyphenyl | Sebacoyl | Quinone | 7.9 |
| | | Hydroquinone (A) | 9.9 |

Example 6

In 10.0 ml. dry tetrahydrofuran were dissolved 0.2349 g. (a) terephthaloyl chloride or (b) isophthaloyl chloride and 0.2743 g. duroquinonylpropan-1,3-diol. The solution was cooled in ice-water and 0.35 ml. pyridine was added with stirring. The stirred mixture was allowed to come to room temperature, and after about two hours was poured into water. The resultant yellow precipitate of quinone polymer was separated, dried and purified by solution in tetrahydrofuran and precipitation with ether. The colorless hydroquinone polymer was prepared by reduction the preparation of mixed polycarbonates. Exactly 1.794 g. (8.00 mmole) 2,5 - bis(3'-hydroxypropyl)-1,4-benzoquinone were dissolved in 30 ml. tetrahydrofuran and exactly 1.848 g. (8.00 mmole) diethyleneglycolbischloroformate added taking care to exclude moisture. The mixture was chilled in an ice bath and vigorously stirred with a magnetic stirrer as 4.0 ml. pyridine was slowly added by means of a syringe. Pyridimium hydrochloride started to separate immediately and the reaction mixture became viscous. After stirring for 2 hours at room temperature, the reaction mixture was filtered and worked up as described in Example 7. Yields of purified polymer were about 70%. The oxidized polycarbonate products obtained were reduced to the hydroquinone form in essentially quantitative yields using the procedures described above.

excess of n-hexane with the optional prior addition of 2.0 ml. of ethanol. The polymer precipitated from n-hexane as brown-yellow flakes which were washed several times with n-hexane and dried for 48 hours. The hydroquinone form of the polymer was prepared by hydro-

| Structural unit | Oxidation state | Physical form | Specific viscosity (cm.$^3$/g.) |
|---|---|---|---|
| —Du—O—$\overset{O}{\underset{\|}{C}}$—O | Quinone | Brownish-yellow solid | 9.3 |
|  | Hydroquinone | Slightly yellow wax | 16.5 |
| —Du—O—$\overset{O}{\underset{\|}{C}}$—O(CH$_2$)$_4$O—$\overset{O}{\underset{\|}{C}}$—O | Quinone | Brittle yellow solid | 12.6 |
|  | Hydroquinone | Colorless wax | 14.4 |
| —Du—O—$\overset{O}{\underset{\|}{C}}$(OCH$_2$CH$_2$)$_2$O—$\overset{O}{\underset{\|}{C}}$—O | Quinone | Dark brown oil | 19.2 |
|  | Hydroquinone | Pale yellow oil | 4.4 |
| —Du—O—$\overset{O}{\underset{\|}{C}}$(OCH$_2$CH$_2$)$_{8.5}$O—$\overset{O}{\underset{\|}{C}}$—O | Quinone | Dark yellow oil | 14.0 |
|  | Hydroquinone | Colorless oil | 21.5 |
| —Du—O—$\overset{O}{\underset{\|}{C}}$—(OCH$_2$CH$_2$)$_{30}$O—$\overset{O}{\underset{\|}{C}}$—O | Quinone | Brown-yellow solid | 13.5 |
|  | Hydroquinone | Colorless wax | 13.2 |
| —Du—O—$\overset{O}{\underset{\|}{C}}$(OCH$_2$CH$_2$)$_{400}$O—$\overset{O}{\underset{\|}{C}}$—O | Quinone | White powder | 33.6 |
|  | Hydroquinone | White powder |  |

Note.—Du represents the 1,3-duroquinonylpropan diradical.

Example 9

About 5 ml. of phosgene was collected from a Dry Ice condenser in a flask cooled in an ice-salt mixture. After the gradual addition of 0.2371 g. 2-(duroquinonyl)-propan -1,3-diol in 10 ml. dry tetrahydrofuran, the solution was allowed to come to room temperature. When all of the volatile material had evaporated, the red oily residue was dissolved in dry tetrahydrofuran containing 0.1956 g. 2,5-bis(2'-hydroxyethyl)-1,4-benzoquinone. The reaction mixture was cooled in an ice bath and polycondensation initiated by addition of 0.30 ml. dry pyridine. The reaction mixture was then decomposed by the addition of water, and the gummy material which separated was collected and dried. The crude product was taken up in tetrahydrofuran and precipiated as a dark yellow powder by pouring the solution into an excess of n-hexane. The yield was 0.30 g.

Calculated for (C$_{25}$H$_{26}$O$_{26}$)$_n$ (percent): C, 61.72; H, 5.39. Found (percent): C, 61.54; H, 5.42.

PREPARATIONS OF POLYURETHANES

Example 10

This example illustrates the general procedure utilized for the preparation of quinone polyurethanes. 5.00 mmole of the benzoquinone-2,5-diol reactant and 5.00 mmole of the diisocyanate reactant were dissolved together in 25 ml. of tetrahydrofuran. The mixture was placed in a water bath at 30° C. and triethylamine and/or dibutyltin diacetate added as the catalyst. Care was taken to exclude moisture during the polycondensation step. The reaction mixture was decomposed by pouring into an excess sulfite reduction substantially as described in Example 5. Polymers insoluble in tetrahydrofuran were reduced using 90% formic acid as the solvent.

| Reactants | | | Specific viscosity (cm.$^3$/g.) |
|---|---|---|---|
| 1,4-benzoquinone-2,5-diol | Diisocyanate | Polymer form | |
| 2'-hydroxyethyl | Hexamethylene | Quinone | 4.9 |
|  |  | Hydroquinone | 12.8 |
| Do | Methylene-di-p-phenylene | Quinone | 9.6 |
|  |  | Hydroquinone | 17.7 |
| Do | —C$_{36}$H$_{72}$— | Quinone | 16.8 |
|  |  | Hydroquinone | 19.8 |
| 3'-hydroxypropyl | Methylene-di-p-phenylene | Quinone | 15.8 |
|  |  | Hydroquinone |  |
| Do | —C$_{36}$H$_{72}$— | Quinone | 21.1 |
|  |  | Hydroquinone | 25.4 |

Example 11

This example illustrates the general procedure utilized to prepare further redox polyurethanes. 0.46 g. methylene-di-p-phenylenediisocyanate and 0.22 g. 2-(duroquinonyl)propan-1,3-diol were dissolved in dry tetrahydrofuran. One drop of dibutyltin diacetate was added and stirring continued for an hour at room temperature. Copolyurethanes were prepared by adding 0.21 g. of 2.5-bis(3'-hydroxypropyl)-1,4-benzoquinone continuing the stirring for an additional two hours. The viscous reaction mixture was treated with alcohol to destroy residual isocyanate groups and then poured into an excess of n-hexane. The yellow flakes which precipitated were collected, dissolved in dimethylacetamide and reprecipitated by pouring into a mixture of tetrahydrofuran and n-hexane. The purified quinone polyurethane product was separated and dried. Reduction to the hydroquinone form was effected by means of sodium dithionite, sodium borohydride or catalytic hydrogenation.

| | Reactants | | | Specific viscosity (100 ml./g.) |
|---|---|---|---|---|
| | Diisocyanate | Second diol | Polymer form | |
| 1 | Hexamethylene |  | Quinone | 0.10 |
|  |  |  | Hydroquinone | 0.15 |
| 2 | Methylene-di-p-phenylene |  | Quinone | 0.20 |
| 3 | Hexamethylene | 2,5-bis(2'hydroxyethyl)-1,4-benzoquinone | Quinone | 0.11 |
|  |  |  | Hydroquinone | 0.12 |
| 4 | Methylene-di-p-phenylene | do | Quinone | 0.12 |
| 5 | do | 2,5-bis-(3'-hydroxypropyl)-1,4-benzoquinone | do | 0.13 |

| Empirical formula | Analysis, percent | | | | | |
|---|---|---|---|---|---|---|
| | Calculated | | | Found | | |
| | C | H | N | C | H | N |
| 1 .......... $(C_{21}H_{30}N_2O_6)_n$ | 62.05 | 7.44 | 6.89 | 61.80 | 7.33 | 6.79 |
| 2 .......... $(C_{28}H_{28}N_2O_6)_n$ | 68.84 | 5.78 | 5.74 | 68.77 | 5.98 | 5.63 |
| 3 .......... $(C_{42}H_{60}N_4O_{12})_n$ | 62.05 | 7.44 | 6.89 | 62.20 | 7.33 | 6.74 |
| 4 .......... $(C_{53}H_{50}N_4O_{12})_n$ | 68.06 | 5.39 | 5.99 | 67.91 | 6.04 | 5.38 |
| 5 .......... $(C_{55}H_{54}N_4O_{12})_n$ | 68.59 | 5.65 | 5.82 | 68.34 | 6.11 | 5.52 |

We claim:
1. Redox polyesters consisting of the recurring structural unit in the quinone form:

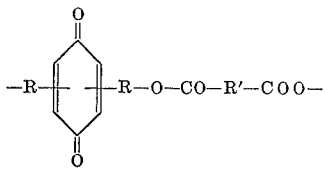

or

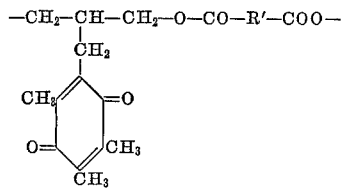

wherein R and R' represent phenylene or alkylene.

2. Redox polyesters according to claim 1 wherein R and R' represent alkylene.
3. Redox polyesters according to claim 1 wherein R represents phenylene and R' represents alkylene.
4. Redox polyesters according to claim 1 wherein R represents alkylene and R' represents phenylene.

References Cited

UNITED STATES PATENTS 2,496,933   2/1950   Caldwell _____ 260—47(C)

OTHER REFERENCES

Hill, Fibres from Synthetic Polymers, pp. 210 and 211, published 1953, Elsevier Publishing Co., New York, N.Y.

WILLIAM H. SHORT, Primary Examiner

L. P. QUAST, Assistant Examiner

U.S. Cl. X.R.

260—47, 61, 75, 77.5